United States Patent
Kossatchev et al.

(10) Patent No.: US 6,898,784 B1
(45) Date of Patent: May 24, 2005

(54) METHOD AND SYSTEM FOR FORMING SKELETONS FOR GENERATING VERIFICATION SYSTEMS

(75) Inventors: Alexander S. Kossatchev, Moscow (RU); Alexei V. Barancev, Moscow (RU); Igor B. Burdonov, Moscow (RU); Alexei V. Demakov, Moscow (RU); Alexander K. Petrenko, Moscow (RU); Harry M. Sumar, Piscataway, NJ (US); Dmitri Galter, Nashua, NH (US)

(73) Assignee: Nortel Networks Limited, St. Laurent (CA)

( * ) Notice: Subject to any disclaimer, the term of this patent is extended or adjusted under 35 U.S.C. 154(b) by 326 days.

(21) Appl. No.: 09/663,568

(22) Filed: Sep. 15, 2000

(30) Foreign Application Priority Data

Sep. 17, 1999 (WO) .............................. PCT/RU99/00340

(51) Int. Cl.[7] .............................................. G06F 9/44
(52) U.S. Cl. ..................................... 717/126; 717/106
(58) Field of Search ................................ 717/106–109, 717/120–135; 714/37–38

(56) References Cited

U.S. PATENT DOCUMENTS

| | | | |
|---|---|---|---|
| 5,390,131 A | * | 2/1995 | Rohrbaugh et al. ............ 716/4 |
| 5,737,609 A | | 4/1998 | Reed et al. ................. 395/704 |
| 5,781,720 A | | 7/1998 | Parker et al. |
| 5,784,553 A | | 7/1998 | Kolawa et al. ............... 714/38 |

(Continued)

FOREIGN PATENT DOCUMENTS

| | | | |
|---|---|---|---|
| EP | 0286361 A2 | 10/1988 | |
| EP | 0 406 602 A2 | 9/1991 | ........... G06F/11/00 |
| EP | 0834810 A1 | 4/1998 | |
| WO | WO 99/21404 | 5/1999 | |

OTHER PUBLICATIONS

Balcer, Marc J. et al., "Automatic Generation of Test Scripts from Formal Test Specifcations," Siemens Corporate Research, http://portal.acm.org, 1989, XP002250291.

Evans, Matt et al., "Assertion Definition Language Translation System," Sun Microsystems Laboratories, http://ad-1.opengroup.org/documents/Archive/94sympos.doc.pdf, Aug. 31, 1994, XP002250292.

(Continued)

*Primary Examiner*—Anil Khatri
*Assistant Examiner*—Lawrence Shrader
(74) *Attorney, Agent, or Firm*—Withrow & Terranova, PLLC (57) ABSTRACT

A verification system for a procedure interface is generated by using formal specifications of the procedure interface and generating test suites. The test suites are generated from the formal specifications and templates or skeletons which are used to generate an element of a verification system. The skeletons are generated based on decomposition of test suits.

25 Claims, 7 Drawing Sheets

U.S. PATENT DOCUMENTS

| | | | | | |
|---|---|---|---|---|---|
| 5,860,004 | A | * | 1/1999 | Fowlow et al. | 717/109 |
| 5,860,009 | A | | 1/1999 | Uchihira et al. | 395/706 |
| 5,913,023 | A | | 6/1999 | Szermer | 395/704 |
| 5,974,569 | A | * | 10/1999 | Nickles | 714/38 |
| 5,987,239 | A | * | 11/1999 | Kirsch | 716/1 |
| 6,093,215 | A | * | 7/2000 | Buxton et al. | 717/107 |
| 6,146,026 | A | * | 11/2000 | Ushiku | 709/207 |
| 6,212,667 | B1 | * | 4/2001 | Geer et al. | 716/6 |
| 6,249,526 | B1 | * | 6/2001 | Loukianov | 370/442 |
| 6,381,604 | B1 | * | 4/2002 | Caughran et al. | 707/10 |
| 6,401,230 | B1 | * | 6/2002 | Ahanessians et al. | 716/1 |
| 6,434,500 | B1 | * | 8/2002 | Boehne et al. | 702/120 |
| 6,453,292 | B2 | * | 9/2002 | Ramaswamy et al. | 704/235 |
| 6,499,114 | B1 | * | 12/2002 | Almstead et al. | 714/25 |
| 6,510,402 | B1 | * | 1/2003 | Logan et al. | 702/186 |

OTHER PUBLICATIONS

Heiser, John E., "An Overview of Software Testing," Autotestcon, IEEE Autotestcon Proceedings, Anaheim, CA Sep. 22–25, 1997, New York, NY, XP010253020.

Thees, Joachim and Gotzheim, Reinhard, "The experimental Estelle Compiler—Automatic Generation of Implementations from Formal Specification," Proceedings of FMSP 1998, The Second Workshop on Formal Methods in Software Practice, Clearwater Beach, FL Mar. 4–5, 1998, XP000970954.

"Formal Derivation of Finite State Machines for Class Testing," *Lecture Notes in Computer Science*, Sep. 1998, V. 1493, pp 42–59.

"Measurement and Verification Approaches for AI Systems," http://ke13.eecs.uic.edu/USAF/appr/docappr.html, Mar. 19, 1999.

"Algebra of Normal Forms," *Summary, Journal of Formalized Mathematics*, vol. 2, Oct. 5, 1990.

"Disjunctive Constraint," http://www.ifcomputer.de/manuals/cons/node56.html.

Wing, Jeannette and Gong, Chun, "Testing and Verifying Concurrent Objects," Journal of Parallel and Distributed Computing, Academic Press, Duluth, MN, vol. 17, No. 1 / 2, 1993, pp. 164–182.

"ADL 2.0 Translation System," ADL 2.0 Translation System Design Specification, Verson 1.1, Online!, Aug. 7, 1998, pp. 1–132, XP002215027, http://adl.opengroup.org/documents/ADL2Ds.pdf.

* cited by examiner

METHOD AND SYSTEM FOR FORMING SKELETONS FOR GENERATING VERIFICATION SYSTEMS

This invention relates to a system and method for forming skeletons for generating a verification system for verifying procedure interfaces.

BACKGROUND OF THE INVENTION

A software system contains a functionally closed set of procedures. In order to ensure correct implementation of the software system, it is desirable to determine a software contract, i.e., elements and functional specifications of external interfaces of the software system, and carry out conformance testing of the software contract implementation. Since the elements of the software contract are procedures, it is in fact Application Programming Interface (API) testing.

A kernel of an Operating System (OS) comprises API. For example, a Support Operating System (SOS) is a real-time OS for a Digital Multiplexing Switch (DMS) for a communication system. SOS comprises a plurality of processes for supporting the operation of DMS. The lowest layer of SOS is SOS kernel. The SOS kernel allocates resources to the processes running under SOS. The SOS kernel also provides communication among these processes. The SOS kernel also creates, controls and removes these processes.

SOS supports more than 25 million lines of code for applications and utilities. Thus, it is critical that user procedure interfaces of the SOS kernel be stable and reliable for correct performances of the DMS switch. The SOS kernel consists of over 17,000 procedures or over 230,000 lines of source code. Thus, it is very complicated and time consuming processes to generate a system for verifying such complex procedure interfaces. There existed no automatic or semi-automatic mechanisms to aid such generation of a verification system.

At the same time, SOS continuously evolves. Also, SOS is often ported to new hardware and software platforms. While more than 75% of the kernel procedures are machine-independent, the remainder of the kernel procedures are very machine dependent. The remainder describes particularity of memory, inter-processor communication and communication with peripheral devices. Accordingly, when SOS evolves or SOS is ported to a new platform, the SOS kernel and its procedure interfaces are also modified. Thus, the verification system for the procedure interfaces of the SOS kernel also needs to be modified. However, there existed no automatic or semi-automatic modifying mechanisms to aid such modifications.

There are some systems proposed for building a verification process. One of such systems is Interactive Tree and Tabular Combined Notation (TTCN) Editor and eXecutor (ITEX). ITEX is a test environment for communicating systems. It includes a TTCN and Abstract Syntax Notation.1 (ASN.1) analysis and design tool, a test simulator and support for generation of complete Executable Test Suites (ETS). In accordance with ITEX, a Test Suite is made up of Test Cases in form of tables. ITEX provides a set of highly integrated tools for development and maintenance of Abstract Test Suites (ATS) written in TTCN. ITEX supports phases of the test suite development including Test Case Generation, Editing, Verification, Validation and Execution. This toolset is integrated with the Specification Description Language (SDL) Design Tool (SDT), which is an environment for design of SDL specifications. Test suites described with TTCN can be transformed to the form that allows testing both implementation in some programming language and specification in SDL. However, this approach is unsuitable for API testing. TTCN does not permit declaration of pointers and other software entities that do not have textural (literal) representation. A major limitation of SDL-like specifications is their explicit form. This means that it is easy to build models and prototypes based on them but it is very difficult to develop a system of constraints that define the union of all possible implementations.

Another example is the Algebraic Design Language (ADL)/ADL2. From formal specifications, ADL generates test oracles and skeletons for building test drivers and documentation. ADL uses not one of the popular specification languages but extensions of C and C++ languages. There are ideas on extensions of Java and other object-oriented languages aimed at developing software in "Design-by-Contract" fashion. However, despite the obvious advantages of better acceptance of such languages in the software engineering community, the concept, not to mention the common notation, is still far in the future. ADL has a limited range of API classes for which it can provides means for specifications and automatic test generation. ADL provides adequate tools for test generation automation only for procedures whose parameters allow independent enumeration and allows testing procedures one by one. This means that ADL omits procedures with dependent parameters, procedures that require testing in a group, e.g., "open-close", or those that require testing in parallel mode, e.g., "lock-unlock", or "send-receive".

Another example is formal derivation of Finite State Machines (FSM) for class testing proposed by L. Murray, D. Carrington, I. MacColl, J. McDonald and P. Strooper in "Formal Derivation of Finite State Machines for Class Testing", in Jonatthan P. Bowen, Andreas Fett, Michael G. Hinchey (eds.) ZUM'98: The Z Formal Specification Notation. 11-th International Conference of Z Users, Berlin, Germany, September 1998, Proceeding, Lecture Notes in Computer Science, v. 1493, pp. 42–59. This work is at the research stage. The authors propose a scheme for organization of procedure group testing using Object-Z as specification language and C++ as programming language. The task of this work is stated to build test suites to verify conformance of the implementation to the specification using formal specifications of the methods for a class. As a test coverage criterion, the union of two criteria is used: to cover all equivalence classes that represent the areas obtained as a result of partition analysis, and then, to check results on or near the boundaries. However, the authors of this work do not try to solve the problem of complete automation of test generation. Nor do they attempt to support any elements of the preparation phase with tools. Partition and boundary analysis is done manually according to the methodology proposed by the authors. In a similar way, they build the specification of oracles. Oracles, once compiled into C++, call target procedures and verify the conformance of the results to the specifications. This testing scheme is a framework that dynamically generates test sequences of procedure calls. The framework is controlled by the FSM description which represents an abstraction of a state transition graph of the test class. The authors describe the methodology of building specifications for the classes of states and transitions between them while considering the problem of exclusion of inaccessible states.

This approach needs the full description of the FSM that models the states of the system under test. The theoretical weakness of this approach is that it does not try to come up with a formal methodology to build transformation specifications. It is obvious that serious problems will be encountered when attempting to apply this approach to specifications of real-life complexity. In practical sense, it is clear that the process of test derivation from the specifications is mostly manual activity which limits its applicability to industrial software.

The development of verification system is a labour-intensive process. The total size of a verification system is often similar to the size of the software under test.

Currently, the most commonly used approach to the verification system development is the manual development. There are some tools that can generate some elements of a verification system for the most simple cases of the test parameter set generation, namely, for the case of the manually written list of the test parameter sets in literal form. However, this approach can not be used if some parameter could not be written in literal form. For example, a UNIX file descriptor is returned by operating system as a result of the system call "open file", and can not be written in literal form. This approach also can not be used for testing of the procedure sequence when the out-parameter of some procedure is used as the in-parameter of the another procedure.

It is therefore desirable to provide means to decrease the efforts of the verification system development and to increase its reliability.

SUMMARY OF THE INVENTION

The present invention provides a method and system for forming templates or skeletons which are used to generate an element of a verification system.

In accordance with an aspect of the present invention, there is provided a method for forming a skeleton tool usable for generating a test suite for a verification system for verifying a Procedure Interface Under Test (PIUT). The method comprises decomposing existing test suites, the test suites having automatically generated components and manually developed components and being written in its test suite implementation language; defining one or more standard schemes of procedure testing based on the decomposition of the test suites; providing skeleton description for each scheme in skeleton definition language; and transforming the skeleton description for each scheme into a skeleton tool for generating the test suite of the scheme.

In accordance with another aspect of the present invention, there is provided a system for forming a skeleton tool usable for generating a test suite for a verification system for verifying a Procedure Interface under Test (PIUT). The system comprises a decomposer, a skeleton describer and a skeleton transformer. The decomposer is provided for decomposing test suites. The test suites have automatically generated components and manually developed components. They are written in its test suite implementation language. The decomposed test suites are used to define one or more standard schemes of procedure testing. The skeleton describer is used for providing skeleton description for each scheme in skeleton definition language. The skeleton transformer is provided for transforming the skeleton description for each scheme into a skeleton tool for generating the test suite of the scheme.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

There are different kinds of API entities, such as procedures, operations, functions, methods in C++ and subroutines in Fortran. In this specification, these terms are considered synonyms and all are called "procedure".

Figure 1:
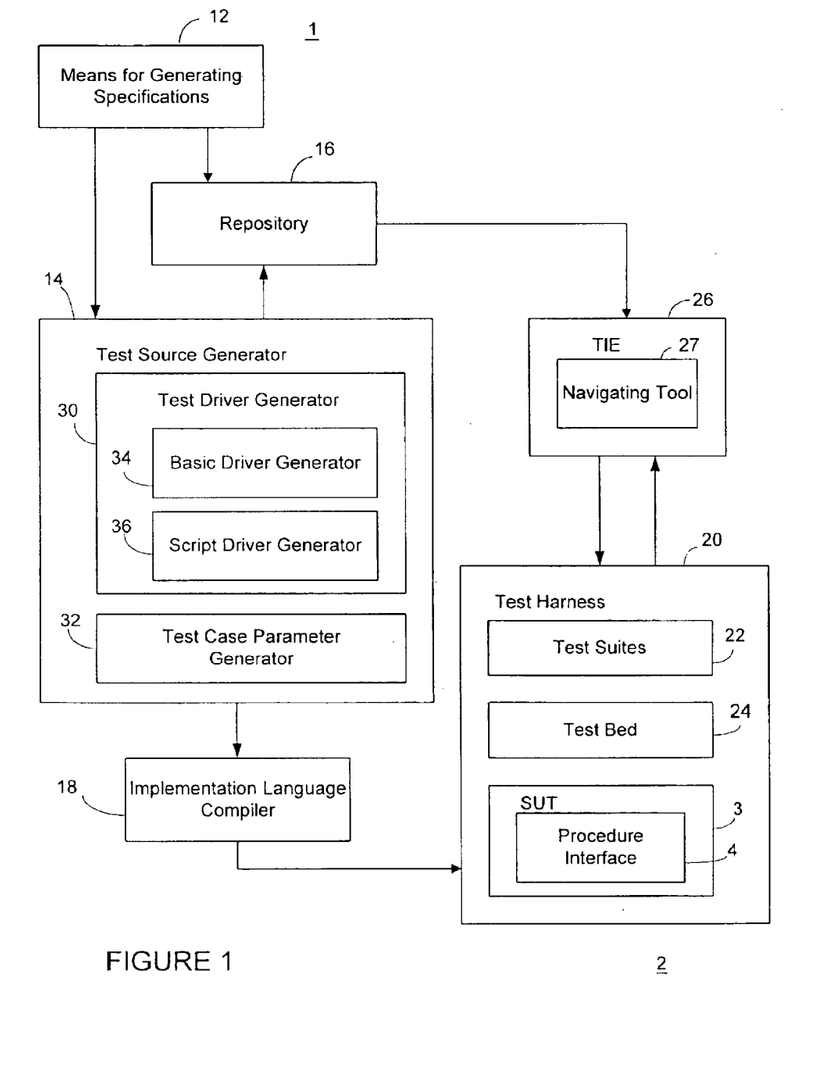
FIG. 1 is a diagram showing an example of a verification system generator to which the present invention can be applied.
Figure 2:
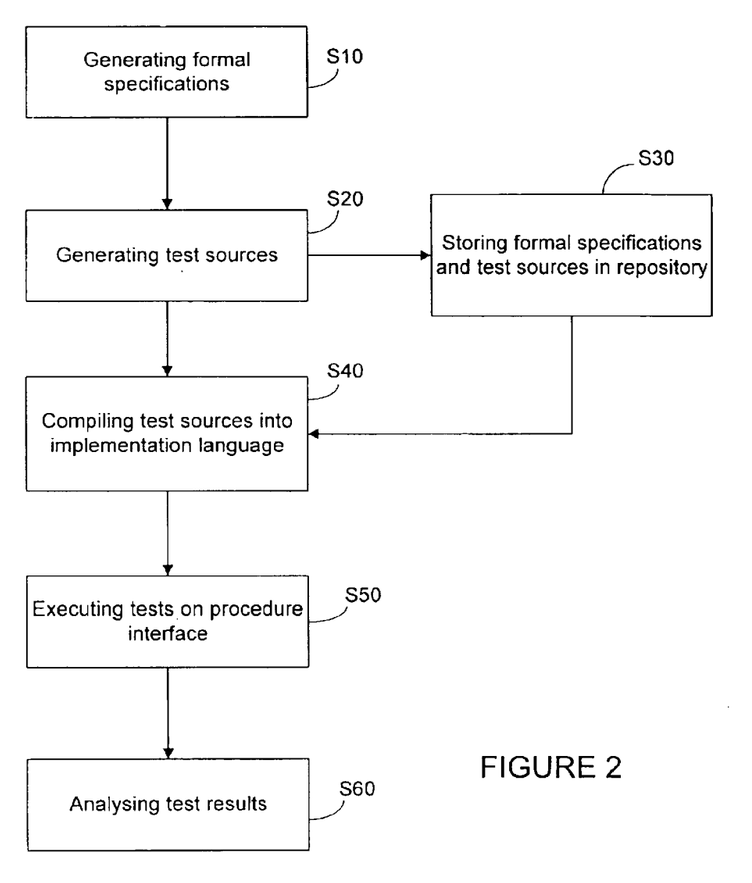
FIG. 2 is a flowchart showing an embodiment of a method for generating a verification system.

Referring to FIGS. 1 and 2, an example of a verification system generator 1 and a method for generating a verification system 2 to which the present invention may be suitably applied are described. The verification system 2 is generated for verifying a procedure interface 4 of a System Under Test (SUT) 3.

The verification system generator 1 comprises means 12 for generating formal specifications, a test source generator 14 and a repository 16. As shown in FIG. 2, the means 12 for generating formal specifications generates formal specifications of the procedure interface 4 (S10). Based on the formal specifications, the test source generator 14 generates test sources (S20). The generated formal specifications and the test sources are stored in the repository 16 (S30).

The test sources are used to generate a test suite 22. The test suite 22 is a set of programs and test data intended for the use in verifying the target procedure interface 4.

The formal specifications are generated in a form independent form implementation of the SUT 3. That is, the formal specifications do not depend on the implementation language, software or hardware of SUT 3, as further described later. The test sources that are generated based on the implementation independent formal specifications are also implementation independent. Accordingly, the test sources may be used on any implementation of the SUT or modified versions of the SUT.

The SUT 3 uses specific implementation language. The test sources are written in specification language that is independent from the implementation language. Accordingly, in order to execute the test sources on the SUT 3 to verify the procedure interface 4 of the SUT 3, the test sources are translated in language executable on the SUT 3 (S40). The translation is carried out by an implementation language compiler 18. The compiler 18 compiles some executable subsets of test sources in the specification language into programs in the implementation language of the SUT 3. The compiled programs are specifications in implementation language that can be interpreted as description of some algorithms.

Thus, the generator of the verification system 2 is carried out in two stages. First, generation of implementation independent programs is performed. Then, implementation independent programs are compiled into those in implementation language of the SUT 3. Such a two step generation method allows the means 12 for generating specifications and the test source generator 14 of the verification system generator 1 to be implementation-independent tools and, in particular, implementation-language-independent tools.

The complier 18 may be a part of the verification system generator 1 or may be provided separately from the verification system generator 1.

The compiled test sources form the test suite 22. As the test sources are implementation independent, the test suite 22 is also independent from the implementation of the target SUT 3, other than the language used. That is, the test suite 22 does not depend on the implementation software or hardware of SUT 3. By using the test suite 22, a test harness 20 including the test suite 22 and a test bed 24 is formed for verifying the procedure interface 4 of the SUT 3, as further described below.

The test suite 22 executes tests on the SUT 3 (S50) and analyses results of the tests to verify the procedure interface 4 (S60).

The verification system generator 1 "automates" test generation of real software for verifying a procedure interface 4 of an SUT 3. The expression "automation" used herein does not necessarily mean fully automated manipulation that creates ready for use test data, test sequences and other infrastructure for test execution and test result analysis. An "automated" process may include steps of manually writing some components in implementation language. When the total size of such manually developed components is small as a whole, the process may be considered "automated".

It is preferable that the test source generator 14 comprises a test driver generator 30 and a test case parameter generator 32.

The test case parameter generator 32 generates test case parameter sources for generating test case parameters. That is, the test case parameter generator 32 generates constant arrays and programs that generate and select needed test case parameters. The test case parameters are represented by these constant arrays and programs.

Based on the formal specifications, the test driver generator 30 generates test driver sources for generating test drivers. The test drivers execute tests on the SUT 3 using the test case parameters in implementation environments and analysing results of tests.

The test drivers comprise programs to execute and control testing of the procedure interface 4. The test case parameters are parameters of a test case. A test case is an instance of a tested procedure. A test case is defined by a procedure name and its parameters, i.e., test case parameters. Also, state of environment may be a factor of defining a test case. The test drivers use the test case parameters and execute test cases on the SUT 3 to verify the procedure interface 4.

The test driver generator 30 generates the test driver sources which, once compiled into the test drivers by the implementation language compiler 18, fulfil functions to initialize the procedure interface 4, prepare input values, call tested procedures with test case parameters, and receive test procedure results and analysis of the test results. In general case, the test driver sources are complex programs.

It is preferable that the test driver generator 30 generates the test driver sources that, once compiled into the test drivers, do not only pass some previously generated test case parameters to the SUT 3, but also control the state of the SUT 3. If the SUT 3 state violates some conditions of the test, the test drivers do not supply test parameters to the procedure interface 4.

As the formal specifications are implementation independent, the generated test driver sources and test case parameter sources are also implementation independent.

The test driver generator 30 preferably comprises a basic driver generator 34 and a script driver generator 36. The basic driver generator 34 analyses the formal specifications, and generates the basic driver sources comprising programs in implementation-independent language. The basic driver sources are used for generating a basic driver in implementation language. The basic driver is a test driver for a target procedure 4. The basic driver checks whether pre-conditions for the target procedure 4 hold for a given tuple of input parameters, calls the target procedure 4 with the given tuple of input parameter, records corresponding output parameters, and assigns a verdict on the correctness of the target procedure execution results. The basic driver preferably also collects information necessary to estimate test coverage or investigate reasons for a fault, as described below.

The script driver generator 36 generates script driver sources which describe sequences of calls to the basic driver with different test case parameters. The script driver sources are used for generating script drivers in implementation language. A script driver is a test driver for a target procedure or a set of target procedures. A script driver reads test options, generates sets of input parameters based on test options, and calls a basic driver with some set of input parameters. A script driver may also perform extra checking of the correctness of the target procedure execution results and assigns a verdict. A script driver may also check whether the test coverage is complete, and if not, it may continue to generate sets of input parameters and call the basic driver with this tuple.

The present invention may be suitably applied to generation of a verification system for arbitrary procedure interface of arbitrary systems. For example, the present invention is suitably applied to generate a verification system for procedure interfaces of a kernel of a Support Operating System (SOS) for a Digital Multiplexing Switch (DMS). The invention is hereinafter described mainly for verification of SOS kernel interfaces, but it is not limited to this application.

Generating formal specifications

Figure 3:
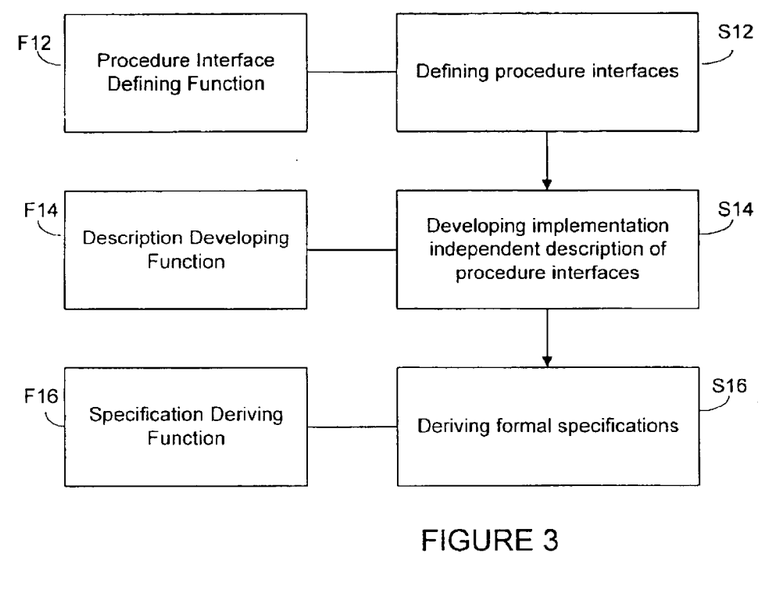
FIG. 3 is a flowchart showing steps of formal specification generation shown in FIG. 2.
Figure 4:
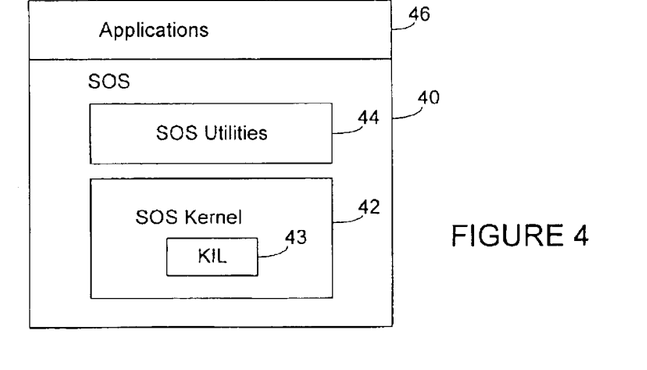
FIG. 4 is a diagram showing a structure of a Support Operation System (SOS)

The generation of the formal specifications of the procedure interfaces is further described referring to FIGS. 3 and 4.

The means 12 for generating specifications first provides a function (F12) for defining procedure interface of the SOS kernel (S12).

As shown in FIG. 4, SOS 40 has SOS kernel 42 and SOS utilities 44. SOS 40 supports applications 46. SOS 40 is written using Nortel Networks Corporation's proprietary programming language called Protel, which is an example of the implementation, or target, language.

The SOS Kernel 42 comprises a plurality of procedures. The procedure interface defining function (F12) categories the procedures of the SOS Kernel 42 into two groups: one group for those depending on implementation of SOS 40, and the other group for those independent from implementation of SOS 40. The procedure interface defining function (F12) then defines procedure interfaces to consist of procedures that are implementation independent. The defined procedure interfaces form a Kernel Interface Layer (KIL). KIL 43 does not depend on implementation and, in particular, on hardware special features of SOS 40. The procedure interfaces of KIL 43 are defined such that each procedure in KIL 43 performs one and only one service. No two procedures provide the same service. Thus, KIL 43 comprises minimal and orthogonal procedures needed by upper layers of SOS 40 and applications 46. KIL 43 hides internal data structures and implementation details of the SOS kernel 42.

Based on the defined procedure interfaces of KIL 43, the means 12 for generating specifications provides a function (F14) for developing implementation independent description of the procedure interfaces of KIL 43 (S14).

The description developing function (F14) rigorously describes functionality of the procedure interfaces of KIL 43.

The implementation independent description may be developed using reverse engineering. The basic idea of the reverse engineering approach is a gradual "upwarding" of data representation in defined implementations. "Upwarding" is increasing the level of abstraction.

Figure 5:
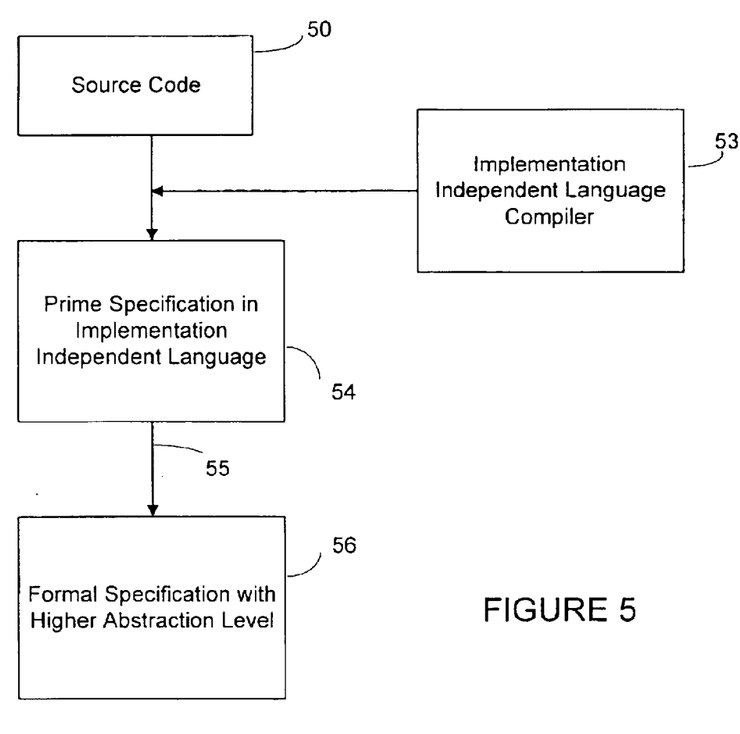
FIG. 5 is a diagram showing an example of formal specification generation.

For example, as shown in FIG. 5, it may be developed using source code 50 of the SOS kernel 42. The source code 50 is in the implementation language of SOS 40. The source code 50 is compiled into implementation independent language to generate a prime specification, i.e., implementation independent description 54. It is preferable to use an implementation independent language compiler 53 to carry out this compiling process automatically.

The implementation independent description may also be developed from documents or other information of the SOS Kernel 42.

As shown in FIG. 3, the means 12 then provides a function (F16) for deriving formal specifications of KIL 43 from the implementation independent description (S16). In the example shown in FIG. 5, the level of abstraction of the prime specification 54 is increased to generate a formal specification 56. This abstraction process 55 may be carried out manually.

It is preferable to use Rigorous Approach to Industrial Software Engineering (RAISE) to generate formal specifications. RAISE Specification Language (RSL) is suitable to write formal specifications. RSL is supported by commercial tools for syntax and semantics checking, such as an EDEN-sintaxicaly oriented editor, a RAISE to ADA compiler, and a RAISE to C++ compiler.

Other RAISE features, e.g., axiom, algebraic specifications and channels may be used in semiformal considerations and explanations.

Also, it is preferable to use model-oriented specification in implicit form as the main form of specification. The implicit form describes a target procedure using pre-conditions and post-conditions of the target procedure.

The means 12 for generating specification may comprise a tool or a set of tools for providing above described functions for aiding a specifier to manually or semi-automatically generates the specifications. An example of such tools is the implementation independent language complier 53 as described above.

It is preferable to classify procedure interfaces of the target SUT by using the specifications. The following classification of procedures of a procedure interface is suitably used for generating a verification system for the procedure interface. The procedure interface classes include five main classes of procedures and some extensions of classes including procedures tested in parallel and expected exceptions. The classes are organized hierarchically. The first class establishes the strongest requirements. Each following class weakens the requirements. The requirements for the five classes are as follows:

KIND_1: The input is data that could be represented in literal (textual) form and can be produced without accounting for any interdependencies between the values of different test case parameters. Such procedures can be tested separately because no other target procedure is needed to generate input test case parameters and analyse the outcome of the tests.

KIND_2: No interdependencies exist between the input items, i.e., values of input test case parameters. The input does not have to be in literal form. Such procedures can be tested separately. Examples of this class include procedures with pointer type input parameters.

KIND_3: Some interdependencies exist, however, separate testing is possible. Examples of this class include a procedure with two parameters in which the first one is array and the second one is a value in the array.

KIND_4: The procedures cannot be tested separately, because some input test case parameters can be produced only by calling another procedure from the group and/or some outcome of tests can be analysed only be calling other procedures. Examples of this class include a procedure that provides stack operations and that receives the stack as a parameter.

KIND_5: The procedures cannot be tested separately. Part of the input and output data is hidden and the user does not have direct access to data. Examples of this class include instances of Object-Oriented classes with internal states; and a group of procedures that share a variable not visible to the procedure user.

Exception raising extension of API classes: The specific kind of procedures raise exceptions as a correct reaction to certain input test case parameters. Examples of this class include a procedure that is supposed to raise an exception after dividing by zero. If zero received as an input parameter, then this procedure must not return any return code.

Generating test sources

Figure 6:
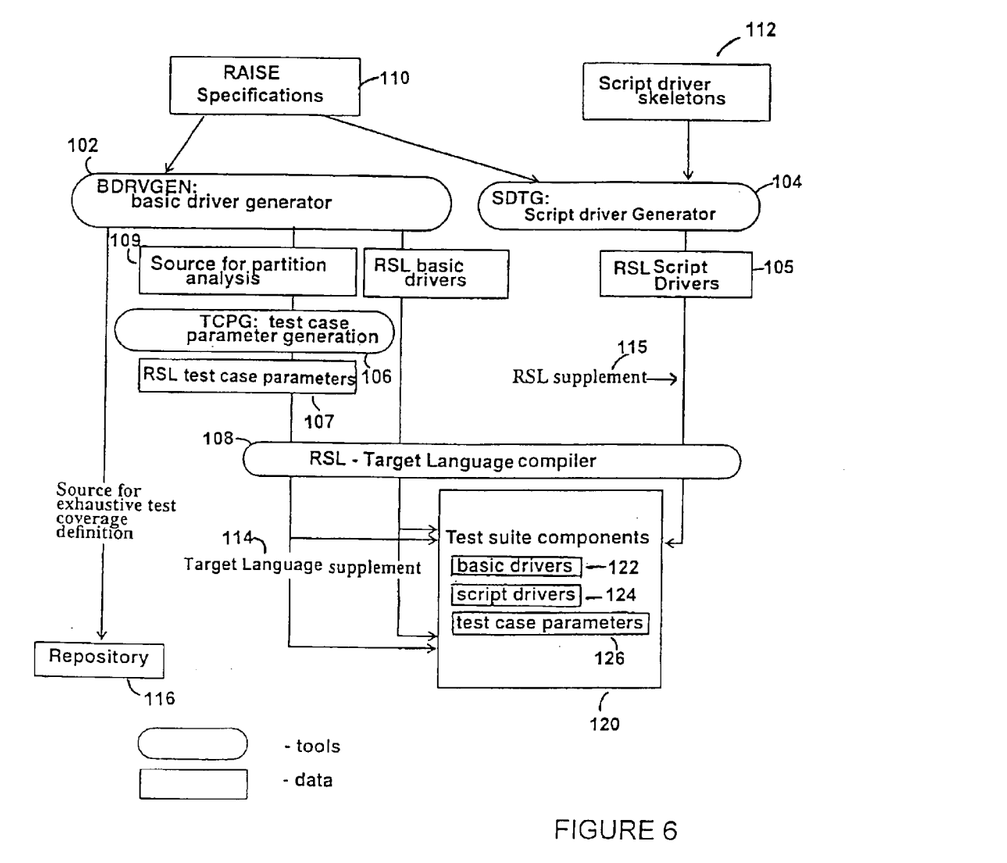
FIG. 6 is a diagram showing an example of test suite generation.

The generation of the test sources is further described referring to FIG. 6. FIG. 6 shows an example of the test generation for a KIL 43 using RAISE as implementation independent language.

The test source generator 100 comprises a basic driver generator 102, script driver generator 104 and test case parameter generator 106. In this example, the test source generator 100 uses UNIX, and the target SOS kernel 42 uses target language. The formal specifications 110 are generated in RSL. Accordingly, the test source generator 100 uses an RSL-target language complier 108 as an implementation language compiler.

The main source of the test source generation is the RAISE specifications 110. The RAISE specifications 110 are written in RSL. The RAISE specifications 110 may be those generated by the means 12 for generating specifications shown in FIG. 1 or those stored in the repository 116.

The basic driver generator 102 receives the specifications 110. The basic driver generator 102 is a tool for generating basic driver sources, i.e., RSL basic drivers 103. The RSL basic drivers 103 are testing procedures in RSL. The basic driver generator 102 executes analysis of the RAISE specifications 110. Based on the analysis results, the basic driver generator 102 generates testing procedure programs comprising the RSL basic drivers 103. That is, the basic driver generator 102 generates, as the RSL basic drivers 103, programs for checking input test case parameters, calling tested procedures, tracing and analysing the test results, assigning a verdict of the outcome, and outputting trace information.

The basic driver generator 102 preferably also generates source for test case parameter generation 109. The source 109 for test case parameter generation preferably includes source for partition analysis, as described below.

The results 103, 109 of the basic driver generator 102 are fully completed in RSL sources. RSL generated sources do not require any customization as they are implementation independent.

The RSL basic drivers 103 generated by the basic driver generator 102 are compiled by the RSL-target language compiler 108 into basic drivers 122 in the target language. The basic drivers 122 comprise target language procedures. Other than the language used, the RSL basic drivers 103 and the basic driver 122 in the target language are the same.

For each procedure in KIL 43, one basic driver 122 is generated. Each basic driver 122 provides direct call of a target procedure in KIL 43, and provides common facilities to test the target procedure. That is, each basic driver 122 takes input test case parameters for KIL 43, and checks pre-conditions of the target procedure. If the pre-conditions are correct, the basic driver 122 makes the call of the target procedure, and checks post-conditions of the target procedure.

The basic drivers 122 may carry out test result analysis by recording execution outcomes and comparing them with required outcomes. The basic drivers 122 may provide the result of the analysis as a verdict. The verdict may be either "passed" or "failed". The "passed" verdict means that no error is detected. The "failed" verdict means that an error is detected.

The basic drivers 122 may have a test oracle to automatically perform the analysis of the test outcome. The test oracle is a program that assigns a verdict on the correctness of outcome for the target procedure. The test oracle is similar to post-conditions. Both the test oracle and the post-conditions have Boolean functions. They have the same parameters, and return "True" if the target procedures produces a correct result and "False" otherwise. Accordingly, the test oracles can be generated once the post-conditions are generated.

The test result may depend on the SOS state and the history of SOS functioning. In order to fulfil its function, each basic driver 122 preferably also generates programs to support a model of SOS state. The model is used to check acceptability of test case parameters in different contexts and to analyse correctness of test results.

The test case parameter generator 106 receives the source for test case parameter generation 109 from the basic driver generator 102. Then, the test case parameter generator 106 generates test case parameter sources, i.e., RSL test case parameters 107. The RSL test case parameters 107 may be constant arrays or programs. The test case parameter programs are also fully completed RSL sources.

The test case parameter generator 106 may also generate test case parameter sources from the specifications.

The RSL test case parameters 107 are compiled into test case parameters 126 by the RSL-target language compiler 108. The test case parameters 126 are input parameters for procedures under testing. Therefore, they are used for basic driver procedures. The test case parameters 126 may include only numeric and/or boolean input parameters. For example, a KIL of SOS includes about 140 procedures which need only such input parameters. These procedures are called KIND_1 procedures, as described above.

The script driver generator 104 receives the RAISE specifications 110, and generates script driver sources, i.e., RSL script drivers 105. The RSL script drivers 105 are compiled by the RSL-target language compiler 108 into script drivers 124 in the target language. Other than the language used, and the RSL script drivers 105 and the script drivers 124 in the target language are the same. The script drivers 124 are the upper level of the basic drivers 122.

Each RSL script driver 103 is a program for testing of a procedure or a group of procedures. It is a sequence of target procedures calls. The sequence may have serial or parallel composition. The sequence may have iterations. The RSL script drivers 103, once complied into the script drivers 124 by the complier 108, realize a scenario or script of testing.

The script driver generator 104 generates, as the RSL script drivers 105, programs to realize the sequences of procedure execution with different test case parameters. The script driver generator 104 generates the RSL script drivers 105 to have no direct interaction with target procedures. That is, the RSL script drivers 105, once complied into the script drivers 124, call the basic driver 122. One or more RSL script drivers 105 may be written to be called by procedures which function as suppliers of test case parameters 126, or procedures that allow a system operator to control a procedure group testing.

The script driver generator 104 may also generate programs to check the verdicts of the basic drivers 122. The script driver generator 104 may also generate programs to assign script driver own verdicts based on the basic driver verdicts.

It is preferable that the script driver generator 104 uses script driver skeletons 112 in addition to the specifications 110. The script driver skeletons 112 describe general scheme of script drivers. That is, each script driver skeleton contains an algorithm of a script driver. The script driver skeletons 112 are specific to each kind of procedure interface.

Each script driver consists of declarations and a body. The declarations include import of the procedure under test and its data structure definitions and/or import of all data and types used in the specifications. The declarations are generated automatically based on the list of procedures under test and their specifications 110. The body of a script driver begins with the script driver option parsing. The options, as parameters of the script driver as a whole, determine the depth of testing, e.g., the level of test coverage criteria, and some specific data like interval of values, duration of testing.

In the example shown in FIG. 6, in order to generate an RSL script driver 105, the script driver generator 104 uses one of the skeletons 112 and the RAISE specifications 110. Union of the specifications 110 and skeletons 112 forms formal description of test suite sources. This formal description may be considered as a test suite specification. The test suite specification allows the generator 100 to define test coverage requirements, schemes of script drivers, and algorithm for checking target procedure behaviours.

The script driver skeletons 112 for a new target SUT may be manually developed or received from the repository 116. Before testing starts, the verification system carries out some initialization. For example, before testing write/read procedures, the verification system opens a file. Such initializations are written manually. After initialization is finished, the main part of the script driver begins.

In addition to specifications 110 and skeletons 112, the script driver generator 104 may also use some supplement sources, such as some instances of test case parameters values.

The script driver generator 104 may also use procedures that convert values derived from the RAISE specifications 110 into value formats used by the current version of SOS kernel 42. Because the specifications 110 are implementation independent, correspondence between the specifications 110 and implementation data structures is separately described. Thus, it is preferable to use some means for associating abstract objects with implementation objects. Some target language procedures convert data from their representation in implementation to and from their representation in the test suite 120. Such target language procedures may be used as the associating means. The target language procedures use post-conditions of the procedure under test. The target language procedures may be manually developed.

These additional sources including manually written skeletons may be called "manually developed components". The size of manually developed components is not large compared to the automatically generated components in the verification system generator 100.

For KIND_1 procedures, full automation of test generation is possible. All other kinds generally need some additional effort for writing manually developed components. The effort gradually grows from KIND_2 to KIND_5. The extensions require more effort than the corresponding kinds themselves. Complexity and effort for the development of manually developed components is usually caused by the complexity of the script driver generation and debugging. All script drivers for different classes of procedures have similar structure. The main distinction is the distribution between automatically generated components and manually developed documents. The KIND_1 script driver is generated fully automatically, KIND_2 script driver is generated almost automatically and so on.

The scheme of a script driver is further described in more detail using an example of a KIND_5 script driver.

The KIND_5 script driver realizes a general algorithm for traversing an abstract Finite State Machine (FSM). This algorithm passes all states and all possible transitions between the states. Each transition corresponds to an execution of a procedure under test.

The algorithm of a script driver is related to the specification and does not depend on the implementation details outside the specification. The script driver algorithm does not have direct descriptions of the abstract FSM. The verification system generator 100 avoids use of direct descriptions because direct specification of the FSM requires extra efforts to generate.

Instead of a direct specification of FSM, the verification system generator 100 uses indirect, virtual representation of FSM. Such representation includes a function-observer and a function-iterator. The function-observer calculates on the fly the current state in the abstract FSM. The function-iterator selects a next procedure from the target procedure group, and generates a tuple of the input parameter values for this procedure.

The KIND_5 script driver algorithm is described in more detail. For example, a case of testing a procedure group is considered. After passing several FSM states, i.e., some target procedures have been called, the next transition is being made. This elementary cycle of testing starts by calling a function-iterator that selects the next procedure from the target procedure group, and prepares a tuple of input test case parameter values for this target procedure. If the function-iterators have managed to generate a new and correct tuple without violation of pre-conditions, then the script driver calls a corresponding basic driver with the tuple as actual test case parameters.

When the basic driver returns a verdict, the control script driver checks the verdict assigned by the basic driver. If the verdict is "False", i.e., an error has been detected, the script driver produces corresponding trace data and finishes. If the verdict is "True", i.e., the elementary test case passed, the script driver calls the function-observer. The function-observer then calculates a current state, logs the state and transition, and continues to traverse FSM.

Thus, all possible states and test the procedures with all needed sets of input parameters may be obtained. FSM is used here as a guideline to pass through all states the needed number of times.

As described above, the script drivers are preferably composed following the requirements of the corresponding skeletons. In this embodiment, overall, the verification system generator 100 uses five skeletons needed for serial testing of API KIND_1 through KIND_5 and one skeleton for parallel testing. Based on a corresponding skeleton and the list of target procedures and specifications, the verification system generator 100 generates a script driver template for each class. A KIND_1 template is a ready-to-use program. The templates for the other kinds include several nests with default initiators and iterators. If a test designer does not need to add or improve anything in the nests, the template can be compiled by the RSL-target language compiler 108 and executed as a script driver 124. This situation is typical for a KIND_2 procedure interface. For other kinds, a test designer usually adds some specific initiators and iterators as RSL supplement 115. The test designer defines FSM state observer for the script drivers of KIND_4 and KIND_5.

Formulation of skeletons

Figure 7:
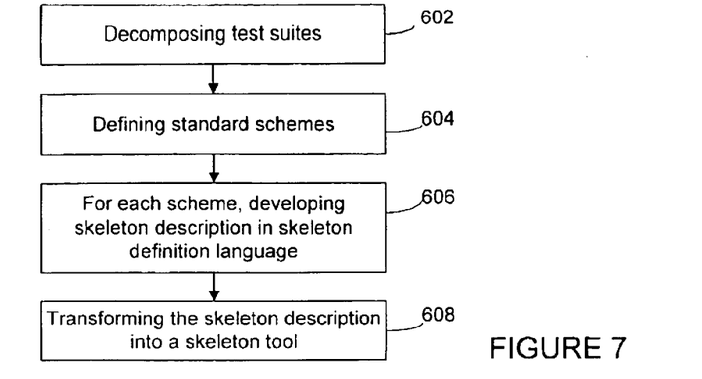
FIG. 7 is a flowchart showing a method of forming a skeleton according to an embodiment of the present invention.

The development or formation of skeletons 112 is now described referring to FIG. 7.

According to the present invention, skeletons 112 are developed by decomposition of test suites (602). Every large system consists of subsystems. A structure that exposes the hierarchical construction of the subsystem is called its decomposition. Test suites have generated and manually-developed components, and these components are exposed by the decomposition.

Standard schemes of the procedure testing are then determined based on the decomposition (604). As described above, the standard schemes include the five kinds, Kind_1 to Kind_5. Each scheme is defined by a skeleton of the test suite.

For each separate scheme of procedure testing, skeleton description is developed in the skeleton definition language (606). The skeleton definition language is analogous to the macro language of an advanced programming language. The main difference between the skeleton language and the macro language is that the skeleton language does not use the macro definitions and macro calls. In this sense, the skeleton language functions as a directive for control of translation.

The skeleton definition language consists of the following parts:

invariant test suite parts written in some test suite implementation language;
  skeleton parameter identifiers;
  repetitors describing the repetitive parts of the test suite;
  variant descriptors of the test suite variants; and slot descriptors for the manually-developed components of the test suite.

Parameters of the skeleton may be text strings, integers, arrays of text strings or arrays of integers. Arrays of text strings or integers may be one dimensional arrays or multi dimensional arrays. Skeleton parameter identifiers identify the type of parameters.

Repetitors and variants descriptors are written in the macro-language of the skeleton definition language. This macro-language may be a subset of the C language. For example, a repetitor may be the following construct:

for (i=1; i<=upbi; i+=1) {<repetitive part including PAR [i]>} where upbi is the integer parameter of the skeleton, and PAR is the one-dimensional array of text strings.

Slot descriptors provides slots in skeletons. Some slots are filled in automatically, and another slots are filled in manually. Each manually filled in slot has the rigorously defined semantics. The slot descriptor supports the rigorously defined semantic. Each slot descriptor consists from two slot boundaries, slot identifier having an arbitrary length string and a default slot filler. The semantic of the clot filler is defined by its identifier. No formal semantic description is provided.

Finally, the skeleton description written in the skeleton definition language is then transformed into a skeleton tool (608) The skeleton tool, or the skeleton, facilitates generation of the test suite of the selected scheme. The translation of the skeleton description may be carried out by transforming the skeleton description into the source code of the skeleton tool for generating the template of test suite. The source code may be C-code. During transformation, each part of the skeleton definition is transformed into the corresponding part of the skeleton tool. That is, the invariant test suite parts of the skeleton description are transformed into constant text strings. The skeleton parameter identifiers are transformed into the definition of the variable. The repetitors and the variant descriptors become the part of the source code of the skeleton tool as they are written in the macro-language of the skeleton description. The slot descriptors also transformed into the constant text strings.

Formal requirements may be written in the skeleton for each slot for manually-developed components.

Figure 9:
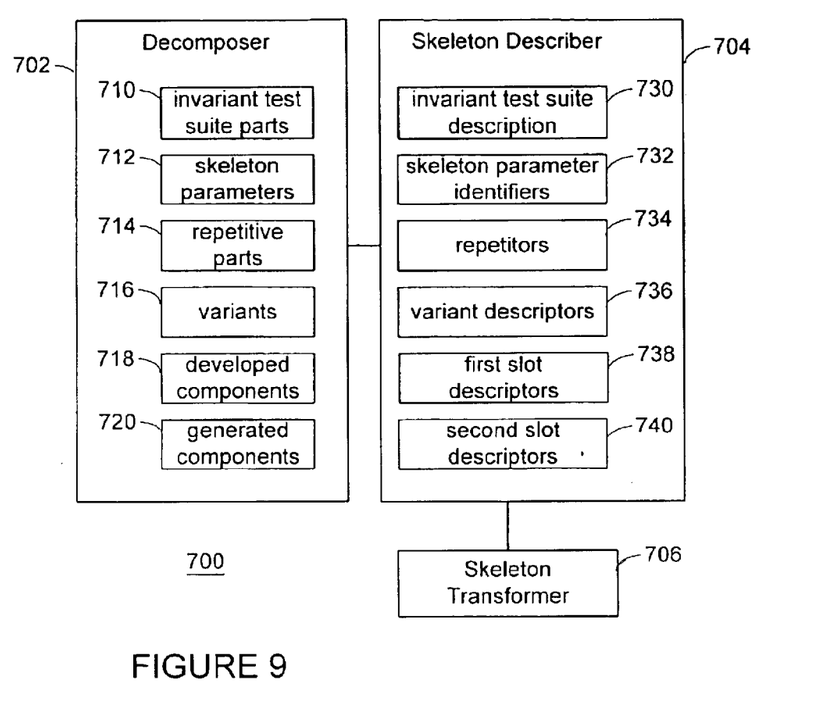
FIG. 9 is a diagram showing a system for forming skeletons in accordance with an embodiment of the present invention.

FIG. 9 shows a skeleton forming system 700 according to an embodiment of the present invention. The system 700 comprises a decomposer 702, a skeleton describer 704 and a skeleton transformer 706.

The decomposer 702 decomposes test suites (602). It has functions 710–720 for identifying specific parts of test suites. The skeleton describer 704 develops skeleton description (606). It has functions 730–740 for creating parts of skeleton description based on the identified parts of the test suites.

Figure 8:
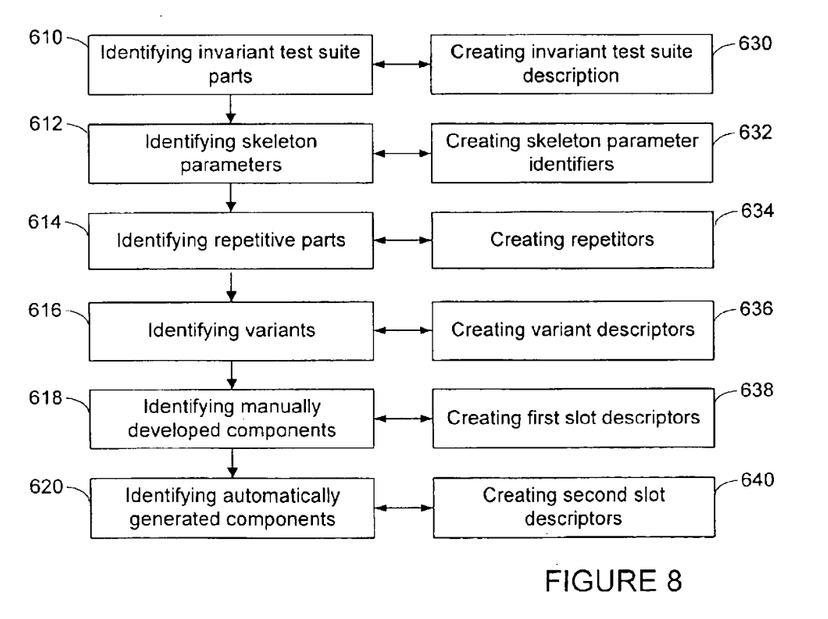
FIG. 8 is a diagram showing an example of the skeleton description development.

As shown in FIGS. 8 and 9, the decomposer 702 has an invariant test suite parts identifier 710 that identifies invariant test suite parts (610). Based on the identified invariant parts, the invariant test suite description creator 730 of the skeleton describer 704 creates invariant test suite description (630).

A skeleton parameter identifier 712 of the decomposer 702 identifies skeleton parameters (612). Based on the identified parameters, an identifier creator 732 of the skeleton describer 704 creates skeleton parameter identifiers (632).

Similarly, identifiers 714–720 of the decomposer 702 identify from the decomposed test suites, repetitive parts, variants, manually developed components and automatically generated components, respectively (614–620). Based on the identified repetitive parts, variants, manually developed components and automatically generated components, creators 734–740 of the skeleton describer 704 creates repetitors, variant descriptors, first slot descriptors and second slot descriptors, respectively (634–640).

The order of identifying those features do not need to follow the above order.

The transformer 706 transforms the skeleton description into a skeleton tool (608). The skeleton tool uses a file containing the skeleton parameter actual values and the components for the slot filling.

Figure 10:
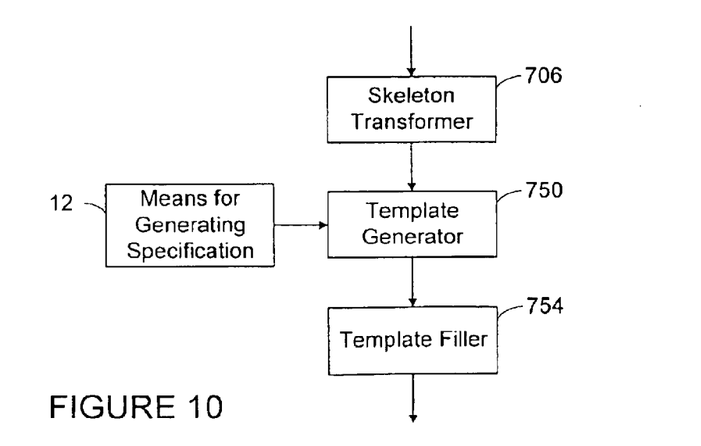
FIG. 10 is a block diagram showing an example of a system for completing test suite sources.

Completed test suite sources will be obtained as a result of the execution of the skeleton tool. For example, as shown in FIG. 10, the skeleton generated by the skeleton transformer 706 is used as an input for generation of a tool, template generator 750. The procedure specification generated by the means for generating specification 12 (FIG. 1) is also used as an input for generation of the template generator 750. The template of the test suite is obtained as the result of execution of the template generator 750. The template contains the slots for manually written parts. A tool, template filler 754, receives the test suite template and a file with manually written parts of the test suite as its input, and generates the completed test suite sources, which will then be compiled into the test suite 22 as described below.

In an example, during test suite development in accordance with the present invention, the size of the manually-developed components can be less than 20% of the total test suite size.

The invention decreases efforts required for the test suite development, and increases reliability of the resultant test suites because of simplifications and formalizations of the requirements to the manually-developed components.

Compilation of test sources

Returning back to FIG. 6, in the generator 100, all kinds of generation by generators 102, 104, 106 produce results 103, 105, 107, 109 in RSL. This means that "front end" of specification and verification technology is implemented in implementation language independent form. All generators 102, 104, 106 can produce the components 122, 124, 126 of the test suites 120 for systems implemented in arbitrary programming languages.

Compilation of generated sources 103, 105, 107 by the RSL-target language compiler 108 may be carried out when generation of all sources 103, 105, 107 is completed. The RSL-target language compiler 108 translates executable subsets of RSL language into programs in the target language. Thus, the RSL-target language compiler 108 restricts RSL. These restrictions are typical for all RSL language compilers. For example, the RSL-target language compiler 108 does not treat explicit definitions of constants if the user does not define the concrete constant value but only defines limitations that restrict constant field of values.

The RSL-target language compiler 108 is implementation-language dependent.

The result of the RSL-target language compiler 108 is generally a group of complete target-language sections. This is a part of the target language module that consists of a few sections. For obtaining a target language program which is ready to execute, some target language sections with interface descriptions may be produced. Interfaces or behaviour of some procedures from SOS are written once and do not need to be rewritten repeatedly. The target language sections with interface descriptions may be produced manually. These target language sections may be called target language supplement 114.

In order to correctly use different generation/compiling tools, it is preferable to know interdependencies between modules of specifications and between results of generation/compiling, i.e., the target language sections, and other target language modules/sections that were manually developed or had been produced by other tools. These interdependencies may be represented by a graph. The complexity of such a graph of interdependencies depends on the size of the procedure interface under test.

For example, currently KIL consists of over 560 procedures divided into over 30 subsystems. For each subsystem, there exists, at least, a basic driver module, and as a whole there exist about 200 script driver modules. For each RSL driver, at least one target language module is generated and stored. Besides, the target language modules consist of a few sections and each section is stored in a separate file. As a whole, KIL requires over 10,000 files. In order to facilitate use of test generation/compiling tools, it is preferable to provide a work "manage" utility, as described later.

The basic drivers 122 invoked by the script drivers 124 are generated fully automatically. The only manually developed components called from basic drivers 122 are data converters of the RSL-target language compiler 108. As mentioned above, the converters transform the model data representation into the implementation representation and vice versa. A model representation is distinguished from the implementation one by the level of abstraction. For example, models may use "infinite" representation of integers, maps, relations, and other data structures suitable for specification. Sometimes model representation is very similar to the implementation one. In this case, such transformation is done by a standard translation algorithm of the specification language into the implementation language.

The verification system generator 100 is suitably used for generating a verification system for a continual evolving SUT. SOS may be evolved in accordance with its life cycle. During evolution cycle, requirements, interfaces or behaviour of some procedures from the SOS kernel, and implementation of SOS are repeatedly modified. For each new version of SOS, it is necessary to develop a new version of verification system. Therefore, it is beneficial to automate process of regeneration of the verification system.

Life cycle of test suites 120 generated by the verification system generator 100 replicates life cycle of the SOS Kernel 42. Usually, only a few interfaces or behaviour of some procedures from the SOS kernel are modified. The verification system generator 100 provides a possibility to re-specify modified interfaces or behaviour of some procedures from the SOS kernel and then re-generate test suites 120, and in doing so to provide re-use of old manually developed components. Thus, the verification system generator 100 can automate test suites regeneration. Therefore, existence of manually developed components does not decrease actual level of automation of the verification system generation.

To support automatic regeneration of test suites 120, the verification system generator 100 preferably stores in the repository 116 all manually developed components developed for generating the test suites 120 separately from automatically generated components. The manually developed components supplement automatically generated components. Therefore, process of the test suites components manually development may be called "supplement". Thus, the verification system generator 100 may use two kind of sources for generating test sources: formal specifications and some supplement sources. As automatically generated and manually developed components of the verification system generator 100 are stored separately, no manual changes in automatically generated components are needed. Therefore, the verification system generator 100 can eliminate need of customizing automatically generated files for each regeneration of the test suites 120.

To estimate effort for generating verification system, a volume of modified interfaces or behaviour of some procedures from the SOS kernel is first estimated. When no interface is modified during SOS evolution, then no test (re)generation is needed. In that case, only realization, i.e., implementation, of SOS is modified Therefore, previous specifications 110 and previous test suites 120 can be used for validation of the new KIL.

When some interfaces or behaviour of some procedures from the SOS kernel are modified or added during SOS evolution, then corresponding specifications 110 need to be modified. When interface data structures are modified, in addition to specifications 110, some conversion procedures in the target language also need to be (re)developed. Those target language conversion procedures may be manually developed. In any case, some reasons for test plan modification may arise. For example, these modifications may be caused by wishes to increase amount of tests, decrease time of testing, to check correlation of some features for parallel execution and so on. In those cases, some manual modification to manually developed components may be needed. When manual modifications are completed, a test designed can automatically generate new test suites 120 for validation of the new SOS kernel by using the verification system generator 100.

In a simple case, it may suffice to modify the specifications 110 of types of pre-condition or post-condition of a target procedure. When new modification of procedure behaviour does not imply on behaviour of other procedure, the generator 100 needs only to regenerate a basic driver for verification of the modified procedure. In a complicated case, the generator 100 may need to regenerate totally new test suites including new basic drivers and script drivers. What volume of test suite modification is required depends on dependencies inside of the specifications 110 and between separate parts of the specifications 110 and test suites components 122–126 generated from these parts. Existing "manage" utility may be used which automates regeneration and recompiling of new test suites, as described later.

In order to port a test suite 120 generated by the verification system generator 100 from one implementation language platform to another, the data converters need to be rewritten and a new RSL to implementation language compiler needs to be provided. Also, a new run-time support system for the test suites with new test bed functions needs to be provided.

It is preferable that the verification system generator 100 also generates data for test coverage estimation and test plan design. The data is preferably kept in the repository 116.

Test coverage measures the completeness of testing. Sometimes, test coverage is presented as percentage of checked test situations. Sometimes, it is a list of test situations that have been or should be checked by the test suites. Test coverage requirements present all possible test situations that must be covered by test suites execution. If test suites 120 meet the requirements, then "exhaustive" or "100%" test coverage is gained.

There is a difference between test coverage estimation for source code and for specifications. In the case of source code, a test situation is associated with a statement, branch of path in control flow graph of a program. In the case of specifications, the specifications are represented as logical expressions, i.e., boolean expressions. Thus, test situations are associated with branches and disjuncts of boolean expressions. Therefore, by using test situations for specifications, it is possible to define test coverage requirements for arbitrary specifications. This allows uniform notation for description and accounting of the test situations, coverage requirements and obtained coverage.

The test suites are generated based on the specifications. The specifications are implementation independent. Thus, the test coverage is preferably measured by means of an implementation independent way. For this purpose, the verification system preferably uses test coverage criteria which are based on the specifications.

In complex SUTs, "all test situations" may not be covered. Accordingly, it is preferable to group similar test situations in classes. In this case, exhaustive coverage may represent coverage of all classes of test situations. Test situations and their classes may be identified and classified based on implementation source code or some external descriptions of the procedures under test. When a so-called "black box" approach is taken to test SUTs, test situations and their classes are identified and classified based on knowledge of descriptions of the procedures under test.

The test coverage criterion is a metric defined in terms of implementation or specification. The most well known test coverage criteria in terms of implementation are:

Class 1—all statements are passed; and

Class 2—all branches are passed.

In the case of using the specifications for test coverage criteria definition, the so-called domain testing approach is preferably used. The whole input space is partitioned into areas by the basic driver generator. Each area corresponds to a class of equivalence.

The source for test case parameter generation 109 generated by the basic driver generator 102 preferably includes source for the partition analysis. The partition determines the choice of one of the test generation techniques applicable to a procedure interface or an interface of a procedure group. The source for partition analysis includes a list of test situation classes that represent test coverage requirements, and initial data for partition analysis. The source for partition analysis is used to generate test case parameters 126.

The partition may be derived from the specifications that describe requirements on input and properties of outcome for target procedures. Both the requirements and properties are represented in pre-conditions and post-conditions of formal specifications in implicit form. Accordingly, the test coverage estimation can be carried out based on the implicit specifications. In this example, the average percentage of the test coverage of the verification system generated by the generator 100 for SOS KIL is 70% to 100% of statements in the implementation.

Furthermore, there are two levels of the test coverage criteria. The first one is the coverage of all branches in post-conditions. The second one is the coverage of all disjuncts, i.e., elementary conjunctions, in the Full Disjunctive Normal Form (FDNF) representation of the post-condition while taking into account the pre-condition terms. The verification system generator 100 allows automatic partitioning in terms of specification branches and FDNF. It is preferable to calculate accessible FDNF disjuncts and remove the inaccessible FDNF disjuncts using pre-condition design.

Monitoring of obtained test coverage is preferably conducted on the fly by script drivers 124. Based on this data, the script drivers 124 may tune testing parameters and/or testing duration.

As described above, the verification system generation consists of a sequence of steps. For a step, needed tools are used where possible. Some tools generate auxiliary data, others convert and union their output and generate resulting target language code. To facilitate usage of these tools, it is preferable to use "manage" utility. The "manage" utility is a tool which works on a standard structure of UNIX directory where the tools and sources for verification system generations and generated test suites are stored.

The "manage" utility works like UNIX "make". It analyses an interdependencies graph which represents interdependencies of the test suite components, and searches "inconsistencies" in the graph. Each "inconsistency" requires to make some kind of generation and compiling. After the "manage" utility removes all "inconsistencies", all needed test suites components become ready to use. The "manage" utility uses a set of UNIX scripts and UNIX "make" files. The "manage" utility uses description of paths for all files used. It is preferable to define a "standard" directory structure to store sources and generated files for generating verification systems, and directories of the verification system generator.

While particular embodiments of the present invention have been shown and described, changes and modifications may be made to such embodiments without departing from the true scope of the invention. For example, the present invention is described mainly using the verification system generator for verifying the SOS kernel. However, the present invention is suitably used for verifying a different system, such as a base level of call processing system, and a management system of tree-like store for queues with different disciplines. The present invention is mainly disclosed using RSL specifications. However, natural language documentation may also be used. Also, the present invention is mainly disclosed using UNIX. However, other operating systems may also be used.

What is claimed is:

1. A method for forming a skeleton tool usable for generating a test suite for a verification system for verifying a Procedure Interface Under Test (PIUT), the method comprising the steps of:

decomposing existing test suites, the test suites having automatically generated components and manually developed components and being written in its test suite implementation language;

defining one or more standard schemes of procedure testing based on the decomposition of the test suites;

providing a skeleton description for each scheme in a skeleton definition language adapted to function as a directive for control of a transformation of the skeleton description into a skeleton tool; and transforming the skeleton description for each scheme into a skeleton tool for generating the test suite of the scheme, wherein said transforming is controlled by said skeleton definition language.

2. The method as claimed in claim 1, wherein the decomposing step includes a step of identifying an invariant test suite part written in the test suite implementation language; and the skeleton description providing step includes a step of creating an invariant test suite description based on the identified invariant test suite part.

3. The method as claimed in claim 1, wherein the decomposing step includes a step of identifying a skeleton parameter; and the skeleton description providing step includes a step of creating a skeleton parameter identifier based on the identified skeleton parameter.

4. The method as claimed in claim 3, wherein the skeleton parameter includes a text string or an integer.

5. The method as claimed in claim 3, wherein the skeleton parameter includes an array of text strings or integers.

6. The method as claimed in claim 1, wherein
the decomposing step includes a step of identifying a repetitive part of the test suite; and
the skeleton description providing step includes a step of creating a repetitor describing the identified repetitive part of the test suite.

7. The method as claimed in claim 6, wherein the repetitor is written in a macro-language.

8. The method as claimed in claim 1, wherein
the decomposing step includes a step of identifying a variant of the test suite; and
the skeleton description providing step includes a step of creating a variant descriptor describing the identified variants of the test suite.

9. The method as claimed in claim 8, wherein the variant descriptor is written in a macro-language.

10. The method as claimed in claim 1, wherein
the decomposing step includes a step of identifying a manually-developed component of the test suite; and
the skeleton description providing step includes a step of creating a slot descriptor describing a slot for receiving a component corresponding to the identified manually-developed component of the test suite.

11. The method as claimed in claim 10, wherein the slot descriptor is written in a macro-language.

12. The method as claimed in claim 10, wherein the slot descriptor provides rigorously defined semantics for manual slot filling.

13. The method as claimed in claim 1, wherein
the decomposing step includes a step of identifying an automatically-generated component of the test suite; and
the skeleton description providing step includes a step of creating a slot descriptor describing a slot for receiving a component corresponding to the identified automatically-generated component of the test suite.

14. The method as claimed in claim 13, wherein the slot descriptor is written in a macro-language.

15. The method as claimed in claim 1, wherein the defining step includes a step of separating procedure testing into different types, each type corresponding to each standard scheme, based on dependency of parameters.

16. The method as claimed in claim 1, wherein the transforming step includes a step of creating a file containing values of skeleton parameters and components for slot filing.

17. A system for forming a skeleton tool usable for generating a test suite for a verification system for verifying a Procedure Interface Under Test (PIUT), the system comprising:
a decomposer for decomposing test suites, the test suites having automatically generated components and manually developed components and being written in its test suite implementation language, the decomposed test suites being used to define one or more standard schemes of procedure testing;
a skeleton describer for providing a skeleton description for each scheme in a skeleton definition language adapted to function as a directive for control of a transformation of the skeleton description into a skeleton tool; and
a skeleton transformer for transforming the skeleton description for each scheme into a skeleton tool for generating the test suite of the scheme, wherein the skeleton definition language controls the transforming.

18. The system as claimed in claim 17, wherein the decomposer includes a feature identifier for identifying particular features of the test suites.

19. The system as claimed in claim 17, wherein the skeleton describer includes a creator for creating parts of skeleton description based on the identified features of the test suites.

20. The system as claimed in claim 18, wherein the feature identifier includes:
an invariant test suite part identifier for identifying an invariant test suite part written in the test suite implementation language;
a skeleton parameter identifier for identifying a skeleton parameter;
a repetitive part identifier for identifying a repetitive part of the test suite;
a variant identifier for identifying a variant of the test suite;
a manually-developed component identifier for identifying a manually-developed component of the test suite; and
an automatically-developed component identifier for identifying an automatically-generated component of the test suite.

21. The system as claimed in claim 20, wherein the skeleton describer includes:
an invariant description creator for creating an invariant test suite description based on the identified invariant test suite part;
a parameter identifier creator for creating a skeleton parameter identifier based in the identified skeleton parameter;
a repetitor creator for creating a repetitor describing the identified repetitive part of the test suite;
a variant descriptor creator for creating a variant descriptor describing the identified variants of the test suite;
a first slot descriptor creator for creating a slot descriptor describing a slot for receiving a component corresponding to the identified manually-developed component of the test suite; and
a second slot descriptor creator for creating a slot descriptor describing a slot for receiving a component corresponding to the identified automatically-generated component of the test suite.

22. The system as claimed in claim 17, wherein the scheme defining means has a function for separating procedure testing into different types, each type corresponding to each standard scheme, based on dependency of parameters.

23. A method for generating test suite sources for a verification system for verifying a Procedure Interface Under Test (PIUT), the method comprising steps of:
decomposing existing test suites, the test suites having automatically generated components and manually developed components and being written in its test suit implementation language;
defining one or more standard schemes of procedure testing based on the decomposition of the test suites;
providing a skeleton description for each scheme in a skeleton definition language adapted to function as a directive for control of a transformation of the skeleton description into a skeleton tool;
transforming the skeleton description for each scheme into a skeleton tool for generating the test suite of the scheme, wherein said transforming is controlled by said skeleton definition language;

generating a test suite template by executing the skeleton tool using a specification of the PIUT; and filling the test suite template using manually written parts of the test suite to generate test suite sources.

24. The method as claimed in claim 23 further comprising a step of compiling the test suite sources into a test suite in implementation language.

25. A method for forming a skeleton tool usable for generating a test suite for a verification system for verifying a Procedure Interface Under Test (PIUT), the method comprising the steps of:

decomposing existing test suites, the test suites having automatically generated components and manually developed components and being written in its test suite implementation language;

defining one or more standard schemes of procedure testing based on the decomposition of the test suites;

providing a skeleton description for each scheme in a skeleton definition language adapted to function as a directive for control of a transformation of the skeleton description into a skeleton tool; and transforming the skeleton description for each scheme into a skeleton tool for generating the test suite of the scheme, wherein said transforming is controlled by said skeleton definition language;

wherein:

the decomposing step includes:

a step of identifying an invariant test suite part written in the test suite implementation language; and a step of identifying a manually-developed component of the test suite; and the skeleton description providing step includes:

a step of creating an invariant test suite description based on the identified invariant test suite part; and a step of creating a slot descriptor describing a slot for receiving a component corresponding to the identified manually-developed component of the test suite; and the defining step includes:

a step of separating procedure testing into different types, each type corresponding to each standard scheme, based on dependency of parameters; and a step of separating procedure testing into different types, each type corresponding to each standard scheme, based on sequences of testing of a group of procedures.

* * * * *